Feb. 5, 1924.
G. W. CURTIS
1,482,599
POWER TRANSMITTING GEARING
Filed June 19, 1922
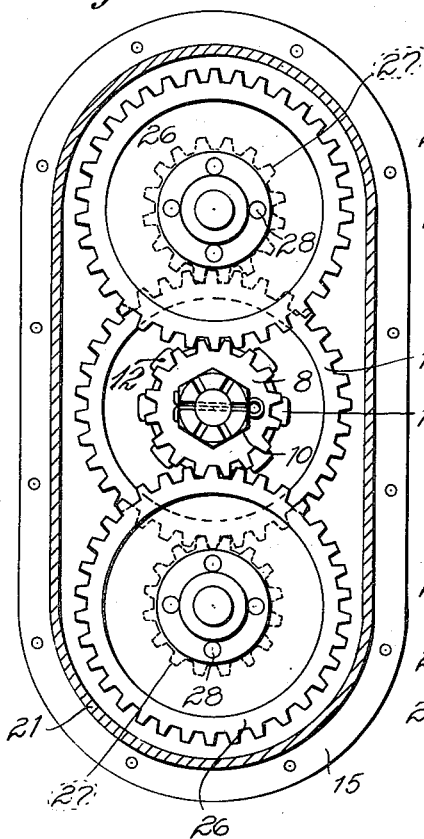
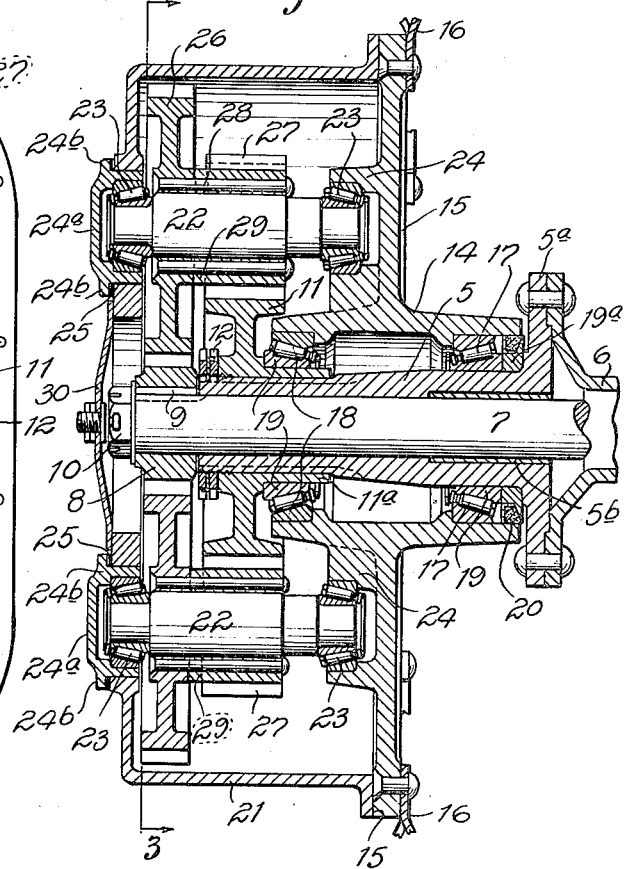
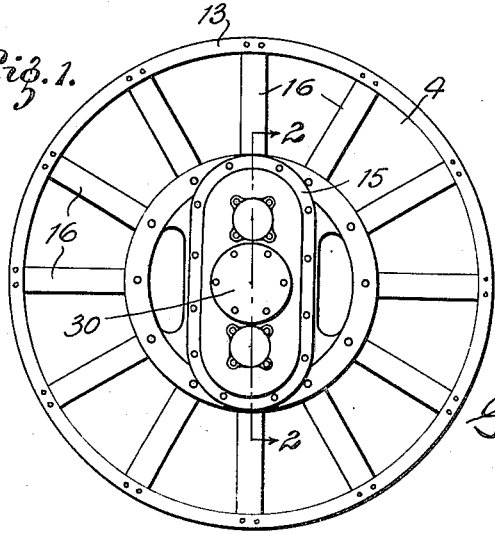

Patented Feb. 5, 1924.

1,482,599

UNITED STATES PATENT OFFICE.

GEORGE W. CURTIS, OF CANTON, OHIO, ASSIGNOR TO THE TIMKEN ROLLER BEARING COMPANY, OF CANTON, OHIO, A CORPORATION OF OHIO.

POWER-TRANSMITTING GEARING.

Application filed June 19, 1922. Serial No. 569,300.

*To all whom it may concern:*

Be it known that I, GEORGE W. CURTIS, a citizen of the United States, a resident of the city of Canton, county of Stark, and State of Ohio, have invented a certain new and useful Improvement in Power-Transmitting Gearing, of which the following is a specification.

This invention relates to power transmitting gearing of the planetary type particularly adapted for application to the traction or driving wheels of motor vehicles, especially tractors or trucks, for obtaining a large gear reduction between driving shaft sections and the traction wheels.

One of the principal objects of the present invention is to prevent excessive torsional stresses on the driving shaft sections and excessive pressure on the gears, whereby the driving shaft sections and the differential gear mechanism may be made considerably smaller than is permissible in transmission mechanism of the common type. Another object is to provide means for simultaneously adjusting the sun gear and the wheel hub bearings associated therewith. Another object is to provide means for readily adjusting the planetary gear shafts longitudinally of their axes. Another object is to enable the axle shaft and the planetary gears and the shafts and the bearings therefor to be removed without dismounting the driving wheel. Another object is to provide for the ready removal and replacement of the driving shaft sections without disturbing the planetary reduction gearing. Other objects are simplicity and cheapness of construction and compactness of design.

The invention consists in the improved planetary reduction gearing hereinafter shown and described; and it also consists in the combinations and arrangements of parts hereinafter described and claimed.

In the accompanying drawing, which forms part of this specification, and wherein like reference numerals refer to like parts wherever they occur, Fig. 1 is an outside face view of a tractor wheel provided with a planetary reduction gearing embodying my invention;

Fig. 2 is a central longitudinal section thereof on the line 2—2 in Fig. 1, the adjacent end portion of a driving axle being shown in connection therewith; and Fig. 3 is a transverse section through the gear housing, the planetary reduction gearing being shown in elevation.

My planetary reduction gearing is shown mounted in one of the driving or traction wheels 4 of a tractor, of which only the end-spindle 5 of the stationary rear axle housing 6 and one of a pair of alined driving shafts 7 are shown. The driving shafts 7 are operatively connected with a differential gear mechanism, which is operatively connected with a propeller shaft to receive motion therefrom and to transmit motion to the traction wheels. This construction of the driving axle is well known and it is considered unnecessary to illustrate it in the accompanying drawing.

The tubular end-spindle 5 is provided at its inner end with a circumferential flange 5ª adapted to be bolted or otherwise rigidly secured to the outwardly flanged tubular end of the hollow rear axle housing 6. The driving shaft section 7 extends axially through the bore in the tubular spindle 5 and is supported therein in a bearing sleeve 5ᵇ. The driving shaft section 7 projects beyond the outer end of the hollow spindle 5 a distance sufficient to accommodate a pinion 8, which is rigidly secured thereto by means of a key 9 and a nut 10 on the threaded extremity of said shaft section.

Mounted on the outer end portion of the hollow axle extension or spindle 5, back of the pinion 8, is a larger gear 11. This gear has an elongated hub portion 11ª, whose bore has longitudinal slots or keyways formed therein to cooperate with corresponding portions on said tubular spindle, whereby rotation of said gear is prevented. The end of the tubular spindle 5 is threaded to receive suitable adjusting nuts 12, whereby the gear 11 may be adjusted longitudinally of the axle.

The traction wheel 4 comprises a rim portion 13 and a hollow cylindrical hub portion 14 having a circumferential flange 15 located midway of its ends and connected to said rim portion by suitable spokes 16. The hub portion 14 of the driving wheel is rotatably supported on the spindle 5, between the circumferential flange 5ª thereof and the inner face of the sun gear 11, by means of a pair of longitudinally spaced conical roller bearings 17. One of these bearings is located adjacent to each end of the hub portion 14 of the driving wheel; and said hub portion has an inwardly extending flange located adjacent to each bearing that serves as abutment for the cup or outer bearing member 18 thereof, thereby preventing longitudinal movement of the bearings towards each other. The cone or inner bearing member 19 of the innermost roller bearing is mounted on the hollow spindle 5 and abuts against a ring 19ª which is sleeved thereon. A suitable packing 20 is located between this ring and the hub of the driving wheel and serves to prevent the escape of lubricant through the inner end of the wheel-hub. The cone or bearing member 19 of the outermost roller bearing is mounted on the elongated hub portion 11ª of the sun gear 11 and abuts against the inner face thereof. By this arrangement, the hub of the driving wheel is rotatably secured to the spindle by two sets of journal bearings that are located substantially in the plane of the wheel. At the same time, this arrangement permits the bearings, together with the sun gear, to be adjusted longitudinally of the axle by manipulating the adjusting nuts 12 at the outer end of the spindle 5.

Rigidly secured to the outer face of the circumferential hub flange 15 of the driving wheel 4 is a casing 21 which cooperates with the hub of the driving wheel to form an oil-tight chamber or housing for enclosing the planetary gearing. One or more, preferably two, spindles or shafts 22 are rotatably supported in the gear housing of the traction wheel parallel with the longitudinal axis thereof. The two spindles 22 are diametrically spaced one on each side of the wheel-axis and at equal distances therefrom; and said shafts are rotatably supported at both ends in conical roller bearings 23. The bearings which support the inner ends of the spindles 22 are mounted in circular recesses formed by circular flanges 24 that project laterally from the inner face of the hub flange 15 of the wheel. The roller bearings for the outer ends of the spindles are mounted in removable caps 24ª that fit openings provided therefor in the front wall of the gear casing 21 and are bolted or otherwise removably secured thereto. Each cap 24ª is provided with a circumferential flange 24ᵇ; and arranged between each flange and the adjacent surface of the gear case are shims 25. This arrangement permits the spindle bearings to be quickly and easily adjusted by using a greater or lesser number of shims.

Each spindle is provided with a double planet gear comprising a large gear 26 and a smaller gear 27. The outermost gears 26 mesh with the pinion 8 on the axle shaft 7; and the innermost gears 27 meshes with the sun gear 11. The gears 26 and 27 are rigidly secured together by rivets 28 and are also provided with interfitting clutch portions 29, whereby said gears rotate together and constitute double planet gears. By this arrangement, the power transmitted to the driving shaft section 7 is transmitted to the large outermost planet gears 26 and thence to the smaller planet gears 27 fixed thereto, which gears rotate on their own axes; and, by reason of said gears 27 meshing with the fixed sun gear 11, the planet gears 27 and supporting shafts therefor are bodily rotated around the axis of the spindle 5, thereby rotating the traction wheel.

One of the important advantages of this construction is that on account of the elongated hub portion of the sun gear, a long spline seat is obtained for preventing excessive torsion on said gear and for obtaining the necessary drive reaction. At the same time, this arrangement locates the sun gear and the adjusting nuts therefor outside of the two wheel bearings and enables the sun gear and the wheel bearings to be readily adjusted without disturbing the planet gears. Another advantage of my invention is that the entire driving wheel can be assembled independently of the tractor and mounted on and dismounted from the tractor as a separate unit.

The gear case 21 is provided with a cover or closure plate 30 which closes a central opening in the outer wall thereof. The removal of this cover permits endwise removal and replacement of the driving shaft section 7 and the pinion 8 without disturbing the remaining parts or the adjustment thereof.

Obviously, the construction hereinbefore described admits of considerable modification without departing from the invention; therefore, I do not wish to be limited to the exact details of the construction shown and described.

What I claim is:

1. In a motor vehicle, an axle housing, a traction wheel sleeved on said housing and adapted to receive journal bearings in the opposite ends of its hub portion, an axle shaft in said housing and projecting endwise therefrom, a pinion on the projecting end of said axle shaft, double planet gears journaled on said traction wheel for rotation therewith and on their own axes, and a sun gear on said axle housing, said double planet gears comprising a gear meshing with said axle shaft pinion and a gear meshing said sun gear outside of the hub portion of said traction wheel, the innermost hub bearing being mounted on the axle housing and the outermost hub bearing being mounted on an elongated hub portion of said sun gear.

2. In a motor vehicle, an axle housing, a traction wheel sleeved on said housing and adapted to receive conical roller bearings in the opposite ends of its hub portion, an axle shaft in said housing and projecting endwise therefrom, a pinion on the projecting end of said axle shaft, double planet gears journaled on said traction wheel for rotation therewith and on their own axes, a sun gear on said axle housing, said double planet gears comprising a larger gear meshing with said axle shaft pinion and a smaller gear meshing with said sun gear outside of the hub portion of said traction wheel, the innermost hub bearing being mounted on the axle housing and the outermost hub bearing being mounted on an elongated hub portion of said sun gear, and means for adjusting said sun gear and the wheel hub bearings longitudinally of their axes.

3. In a motor vehicle, an axle housing, an axle shaft in said housing and projecting endwise therefrom, a pinion fixed to the projecting end of said axle shaft, a sun gear fixed to said axle housing adjacent to said axle shaft pinion and concentric therewith, a traction wheel journaled on said axle housing adjacent to said sun gear, double planet wheels comprising a larger gear meshing with said axle shaft pinion and a smaller gear meshing with said sun gear, a housing for the gears, said housing comprising a portion of said traction wheel and a casing secured to the outer face of said traction wheel, and spindles for rotatably supporting said double planet gears, said spindles being disposed parallel with the axle-axis and having one end journaled in said traction wheel and having the other end journaled in caps that are removably fitted in openings in the outer wall of said gear housing.

4. In a motor vehicle, an axle housing, an axle shaft in said housing and projecting endwise therefrom, a pinion fixed to the projecting end of said axle shaft, a sun-gear fixed to said axle housing adjacent to said axle shaft pinion and concentric therewith, a traction wheel journaled on said axle housing adjacent to said sun gear, double planet wheels comprising a larger gear meshing with said axle shaft pinion and a smaller gear meshing with said sun gear, a housing for the gears, said housing comprising a portion of said traction wheel and a casing secured to the outer face of said traction wheel, spindles for rotatably supporting said double planet gears, said spindles being disposed parallel with the axle-axis and having one end journaled in said traction wheel and having the other end journaled in caps that are removably secured within openings in the outer wall of said gear housing, shims arranged between said removable caps and the adjacent surfaces of said gear housing, said gear housing having a central opening for the axle shaft, and a removable closure plate for said opening.

Signed at Canton, Ohio, this 13th day of June, 1922.

GEORGE W. CURTIS.